United States Patent
Letourneau et al.

(10) Patent No.: US 6,875,259 B2
(45) Date of Patent: Apr. 5, 2005

(54) LOW COST COMBINED AIR CLEANER AND RESONATOR ASSEMBLY

(75) Inventors: Mark Letourneau, Dover Centre (CA); Frances Warren, Chatham (CA); Roderic Cole, Chatham (CA)

(73) Assignee: Siemens VDO Automotive, Inc., Chatham (CA)

( * ) Notice: Subject to any disclaimer, the term of this patent is extended or adjusted under 35 U.S.C. 154(b) by 50 days.

(21) Appl. No.: 10/366,169

(22) Filed: Feb. 13, 2003

(65) Prior Publication Data

US 2003/0159587 A1 Aug. 28, 2003

Related U.S. Application Data

(60) Provisional application No. 60/359,621, filed on Feb. 26, 2002.

(51) Int. Cl.⁷ .............................................. B01D 50/00
(52) U.S. Cl. .................. 96/386; 55/385.3; 55/DIG. 21; 96/388; 123/198 E
(58) Field of Search .......................... 96/380, 383, 386, 96/388; 55/385.3, DIG. 21; 181/214, 229; 123/198 E

(56) References Cited

U.S. PATENT DOCUMENTS

| 2,510,440 | A | * | 6/1950 | Vokes ........................... 96/380 |
|---|---|---|---|---|
| 2,681,123 | A | * | 6/1954 | Sebok ........................... 96/380 |
| 2,748,891 | A | * | 6/1956 | Amlott ......................... 96/380 |
| 2,760,592 | A | * | 8/1956 | Sebok ......................... 181/229 |
| 2,862,572 | A | * | 12/1958 | Amlott ......................... 96/388 |
| 3,209,520 | A | * | 10/1965 | McKinlay ..................... 96/386 |
| 3,226,917 | A | * | 1/1966 | Donovan et al. ............. 96/380 |
| 3,293,830 | A | * | 12/1966 | McKinlay ..................... 96/380 |
| 4,227,898 | A | * | 10/1980 | Kamekawa et al. .......... 96/386 |
| 4,713,097 | A | * | 12/1987 | Grawi et al. .................. 96/380 |
| 5,106,397 | A | * | 4/1992 | Jaroszczyk et al. ........... 96/388 |
| 6,290,739 | B1 | * | 9/2001 | Gieseke et al. ............... 55/330 |

FOREIGN PATENT DOCUMENTS

FR               668738     * 11/1929 .......... 96/FOR 172

* cited by examiner

*Primary Examiner*—Richard L. Chiesa

(57) ABSTRACT

A low cost combined air cleaner and resonator includes two housing members which snap together. An air filter is captured between the two members. A first of the members receives the air filter, and the second of the two members has an enlarged plenum to provide a resonator function. The combined air cleaner and resonator thus provides a low cost way of achieving both functions in a system for supplying clean air to a vehicle engine.

18 Claims, 3 Drawing Sheets

US 6,875,259 B2

LOW COST COMBINED AIR CLEANER AND RESONATOR ASSEMBLY

CROSS REFERENCE TO RELATED APPLICATIONS

This application claims priority to U.S. Provisional Patent Application Ser. No. 60/359,621 filed on Feb. 26, 2002.

BACKGROUND OF THE INVENTION

This invention relates to a low cost combined air cleaner and resonator assembly for vehicle engine air supply systems.

Typically, a vehicle engine is supplied with a source of cleaned air. The air passes through an air cleaner on the way to an inlet manifold. Historically, the air cleaner has been mounted somewhere adjacent to the vehicle in a separate air cleaner housing. Somewhere between the air cleaner and the inlet manifold, modem air supply systems typically include a resonator to reduce engine noise. The resonator is typically an enlarged volume that serves to deaden noise passing from the engine back outwardly through the air supply passage.

The use of the two separate components, namely the air cleaner and the resonator, requires assembly steps for each, and a resultant cost to supply each of the two as separate components. As in all aspects of modem vehicle design, it would be desirable to provide a low cost alternative.

SUMMARY OF THE INVENTION

In a disclosed embodiment of this invention, a combined air filter and resonator provides a low cost option.

In a disclosed embodiment of this invention, the air cleaner is provided in a housing which receives a cap. The cap sandwiches a filter element between a bottom wall of the housing and the cap. Preferably, the cap has a lower wall which sandwiches one end of the filter downwardly against the lower wall of the housing. Further, the filter element preferably is mounted onto a boss extending downwardly from the cap. The cap preferably snaps into the housing.

The cap also provides an enlarged volume such that the resonator is achieved with this single part. Thus, the air flows through an inlet opening in the housing, through the air filter, into a neck portion, and from the neck portion into an enlarged housing chamber in the cap. The enlarged volume thus provides a resonator function prior to the air passing downstream to a vehicle engine.

These and other features of the present invention can be best understood from the following specification and drawings, the following of which is a brief description.

DETAILED DESCRIPTION OF THE PREFERRED EMBODIMENT

Figure 1:
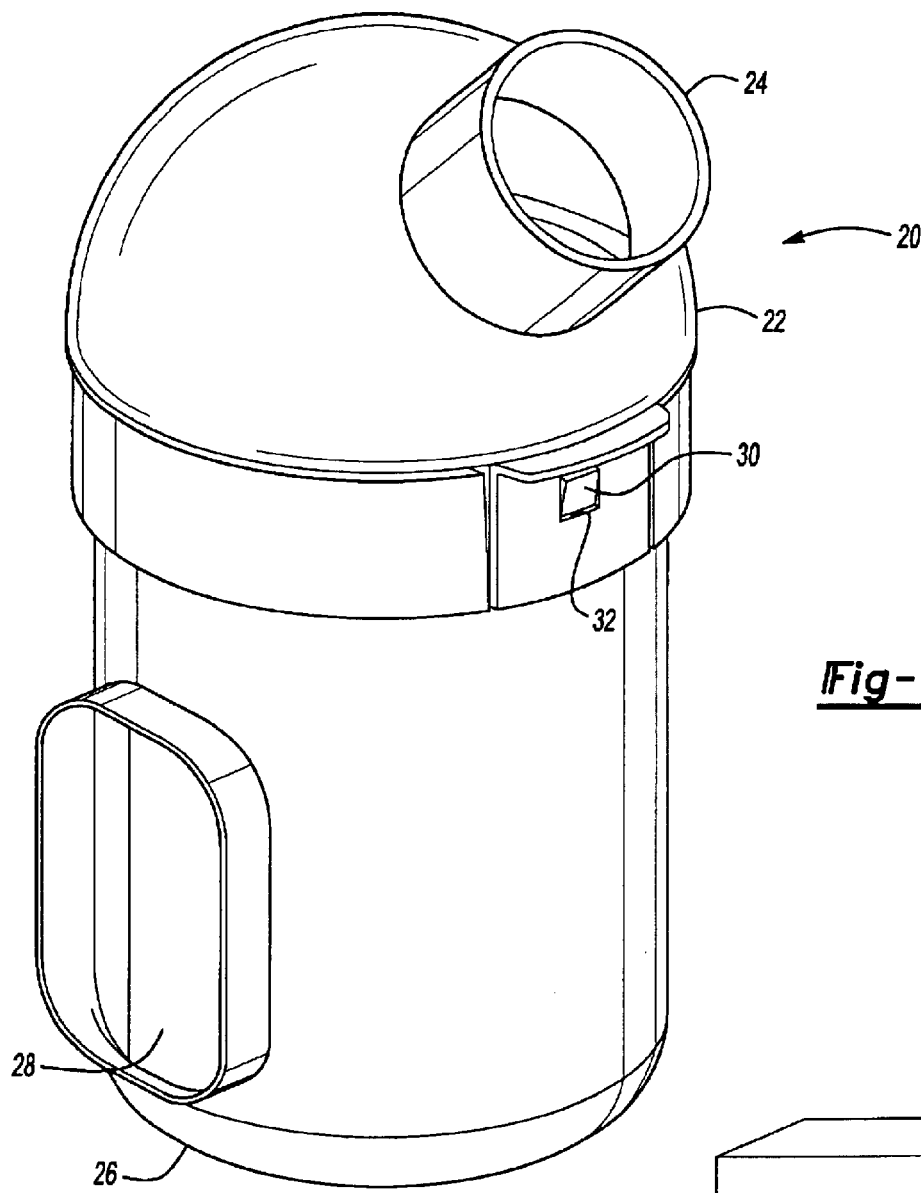
FIG. 1 is a perspective view of an inventive air cleaner and resonator.

A combined air cleaner and resonator assembly 20 includes a cap 22 having an outlet 24. The cap 22 is connected to a housing 26 which has an air supply inlet 28. As shown, a clip 30 snaps into a notch 32 in the housing to secure the cap 22 to the housing.

Figure 1A:
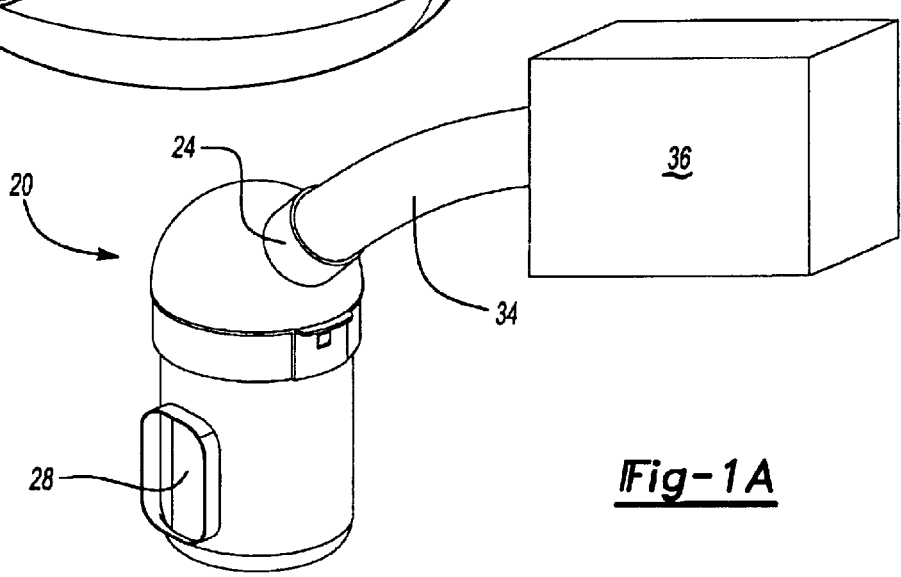
FIG. 1A schematically shows the placement of the inventive air filter and resonator.

As shown in FIG. 1A, the combined air cleaner and resonator 20 takes air in through inlet 28, and supplies air to outlet 24. As shown, a hose, tubes, or other flow structure 34 connects the combined air cleaner and resonator 20 to vehicle engine 36. The combined air cleaner and resonator 20 thus may be mounted remotely from the engine. In addition, the use of the combined air cleaner and resonator eliminates the two separate parts as is currently found in the prior art.

Figure 2:
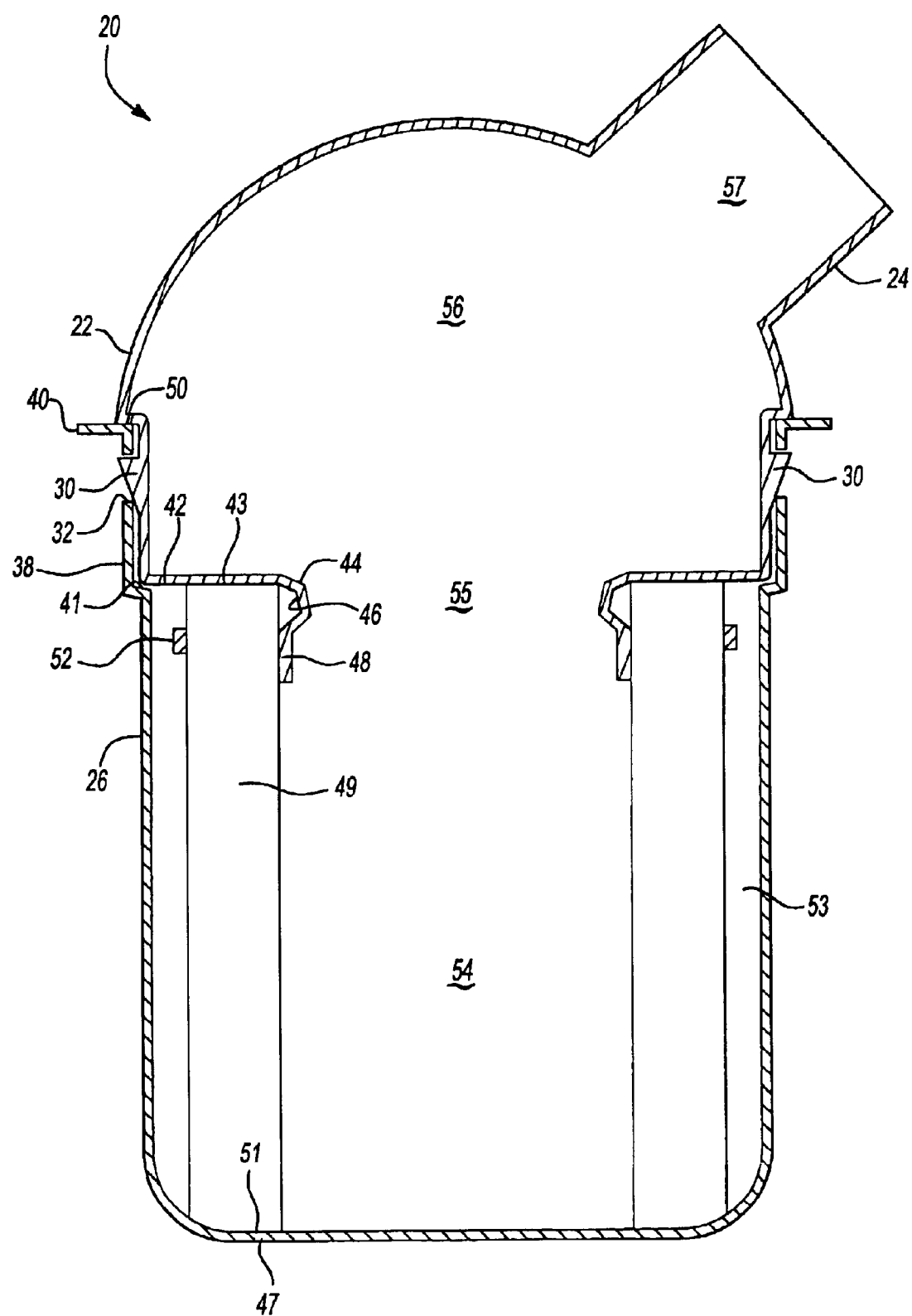
FIG. 2 is a cross-sectional view through the inventive resonator and air cleaner.

As shown in FIG. 2, the cap 22 sits within an enlarged wall portion 38 of the housing 26. A first outwardly extending flange 40 on the housing 26 is abutted by an outwardly extending portion 50 of the cap 22. The housing 26 has another outwardly extending flange 41 extending to the wall portion 38. A bottom wall 42 of the cap 22 preferably rests on the flange 41.

A downwardly extending neck 44 of the cap 22 extends downwardly from the bottom wall 42. A bulged portion 46 extends to a mounting surface 48. Filter element 49 is mounted on surface 48, such as by a small radial seal strap band 52, shown schematically. As can be appreciated in this Figure, a top surface 43 of the filter element 49 and a bottom surface 51 of the filter element 49 are sandwiched between the bottom wall 42 and a lower wall 47 of the cap and housing, respectively. Filter element 49 is preferably an oil wetted reticulated foam filter.

Figure 3:
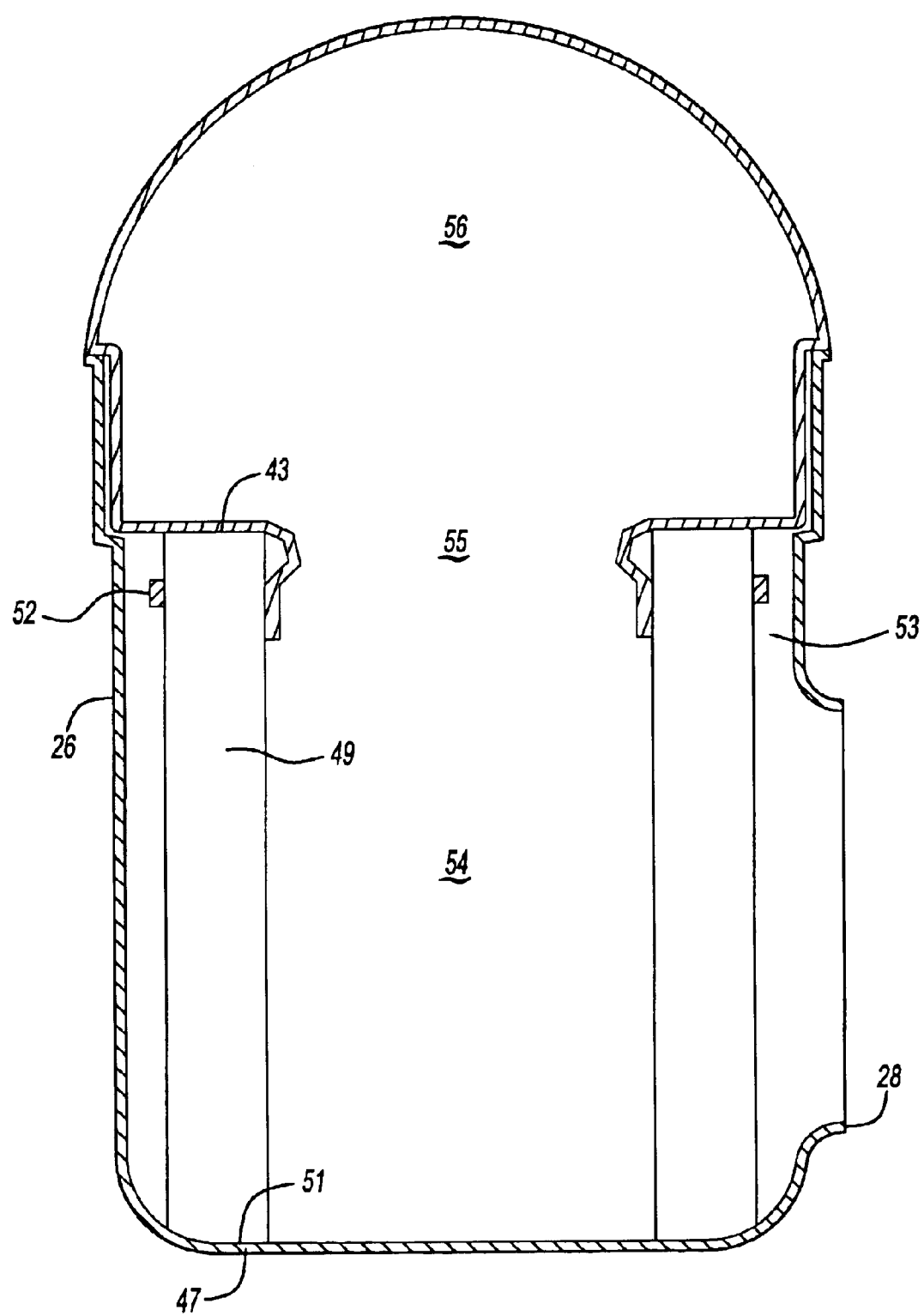
FIG. 3 is another cross-sectional view along a different plane.

As can be appreciated from FIG. 2 taken with FIG. 3, air passes into the housing 26 through the opening 28. The air is received in a space 53 radially outwardly of the filter element 49. The air passes through the filter element 49 and into a space 54. As shown, space 54 passes upwardly to an upper neck portion 55. From neck portion 55, air passes into an enlarged plenum 56. Enlarged plenum 56 is significantly larger in cross section than the neck portion 55. This enlarged plenum provides the resonator function as described above. The shape and configuration of this plenum 56 can be carefully designed to attenuate particular types of noise which are associated with the particular vehicle. From the plenum 56, the air again passes through a smaller portion 57 into the outlet 24.

The present invention thus provides a low cost and easily assembled combined air cleaner and resonator.

Although a preferred embodiment of this invention has been disclosed, a worker of ordinary skill in this art would recognize that certain modifications come within the scope of this invention. For that reason, the following claims should be studied to determine the true scope and content of this invention.

What is claimed is:

1. A combined air cleaner and resonator assembly comprising:

a first housing defining a bottom wall, with an inlet opening extending through said first housing to supply an air to be cleaned into said first housing;

a second housing, said second housing attached to said first housing, said second housing sandwiching an air filter against said bottom wall of said first housing and a wall of said second housing, and said second housing including an enlarged plenum to provide an air resonator function, said second housing including an outlet for supplying air from said enlarged plenum to a vehicle engine.

2. An assembly as set forth in claim 1, wherein said second housing has a radially inwardly extending bottom wall which contacts one surface of said filter element to sandwich said filter element between said first and second housings.

3. An assembly as set forth in claim 2, wherein said bottom wall extends radially inwardly to a downwardly extending neck, said downwardly extending neck being received within an inner periphery of said filter to provide a securement surface for securing said filter to said second housing.

4. An assembly as set forth in claim 1, wherein said second housing and said first housing are snapped together by snaps on one of said first and second housings which engage in notches on the other of said first and second housings.

5. An assembly as set forth in claim 4, wherein said snaps are formed on said second housing, and said notches are formed on said first housing.

6. An assembly as set forth in claim 1, wherein said inlet supplies air into said first housing through a side wall, and radially outwardly of said filter element, said air passing through said filter element into an inner periphery of said filter element, and then into said enlarged plenum in said second housing member.

7. An assembly as set forth in claim 1, wherein air flows from said inlet through the air filter, into said enlarged plenum, and out said outlet.

8. An assembly as set forth in claim 1, wherein said enlarged plenum has a greater diameter than the air filter.

9. An assembly as set forth in claim 8, wherein said enlarged plenum is only located in said second housing.

10. An assembly as set forth in claim 1, wherein a top surface of the air filter abuts against said wall of said second housing and a bottom surface of the air filter abuts against said bottom wall of said first housing.

11. An assembly as set forth in claim 10, wherein said top surface directly engages said wall of said second housing and said bottom surface directly engages said bottom wall.

12. An assembly as set forth in claim 4, wherein said snaps engage said notches to lock said first and second housings together.

13. An assembly as set forth in claim 4, wherein said snaps comprise resilient members.

14. An assembly as set forth in claim 13, wherein said resilient members are integrally formed with said one of said first and second housings and said notches are integrally formed with said other of said first and second housings.

15. A combined air cleaner and resonator assembly comprising:

a first housing defining a bottom wall, with an inlet opening extending through a side wall of said first housing to supply an air to be cleaned into said first housing;

a second housing attached to said first housing, said second housing having a bottom wall sandwiching an air filter against said bottom wall of said first housing, and said second housing including an enlarged plenum to provide an air resonator function, said second housing including an outlet for supplying air from said enlarged plenum to a vehicle engine; and air passing through said inlet opening into a space radially outwardly of said filter element, through said filter element, and outwardly of said first housing into said plenum.

16. An assembly as set forth in claim 15, wherein said bottom wall extends radially inwardly to a downwardly extending neck, said downwardly extending neck being received within an inner periphery of said filter to provide a securement surface for securing said filter to said second housing.

17. An assembly as set forth in claim 15, wherein said second housing and said first housing are snapped together by snaps on one of said first and second housings which engage in notches on the other of said first and second housings.

18. An assembly as set forth in claim 17, wherein said snaps are formed on said second housing, and said notches are formed on said first housing.

\* \* \* \* \*